United States Patent [19]

Jaegers

[11] Patent Number: 4,522,297

[45] Date of Patent: Jun. 11, 1985

[54] TRANSPORTER FOR HEAVY LOADS

[76] Inventor: Leopold Jaegers, Rudolf-Diesel-Str. 1, D-5350 Euskirchen, Fed. Rep. of Germany

[21] Appl. No.: 456,384

[22] Filed: Jan. 7, 1983

[30] Foreign Application Priority Data

Jan. 9, 1982 [DE] Fed. Rep. of Germany ....... 3200495

[51] Int. Cl.³ ............................................. B65G 25/00
[52] U.S. Cl. .................................... 198/774; 414/749
[58] Field of Search ....................... 198/774, 488, 748; 414/749

[56] References Cited

U.S. PATENT DOCUMENTS

| 3,417,858 | 12/1968 | Heard | 198/774 |
| 3,917,078 | 11/1975 | Schmidt | 414/745 |
| 4,042,118 | 8/1977 | Schmidt | 414/564 |
| 4,044,886 | 8/1977 | Sender | 198/774 |
| 4,411,586 | 9/1983 | Zitser et al. | 198/774 |
| 4,440,292 | 4/1984 | Regenbrecht | 198/774 |

Primary Examiner—Joseph E. Valenza
Assistant Examiner—Douglas C. Voorhees
Attorney, Agent, or Firm—Karl F. Ross; Herbert Dubno

[57] ABSTRACT

A heavy-load transport apparatus has a stationary support beam extending horizontally in a transport direction and adapted to support an elongated heavy load with same lying on the support beam and extending horizontally transversely thereto, a guide beam extending in the direction generally parallel to the support beam, and a carriage riding on the guide beam and displaceable in the direction therealong. An actuator connected to the guide beam can vertically displace same between an upper position with the carriage at least partly above the support beam and a lower position with the carriage below the support beam. Thus when the carriage underlies the load and is raised from the lower to the upper position it raises the load off the support beam. A drive including a flexible drive element has a generally straight stretch extending parallel to the direction adjacent the guide beam for displacing the carriage therealong. A pivot on the carriage defines a horizontal pivot axis generally perpendicular to the direction and a rigid connection arm extends generally horizontal and parallel to the direction between the carriage and the stretch. This arm has an inner end connected to the carriage at the pivot for angular displacement of the arm about the axis and an outer end connected to the stretch. Thus as the carriage is raised and lowered the outer arm pivots down and up substantially without vertically deflecting the stretch.

18 Claims, 4 Drawing Figures

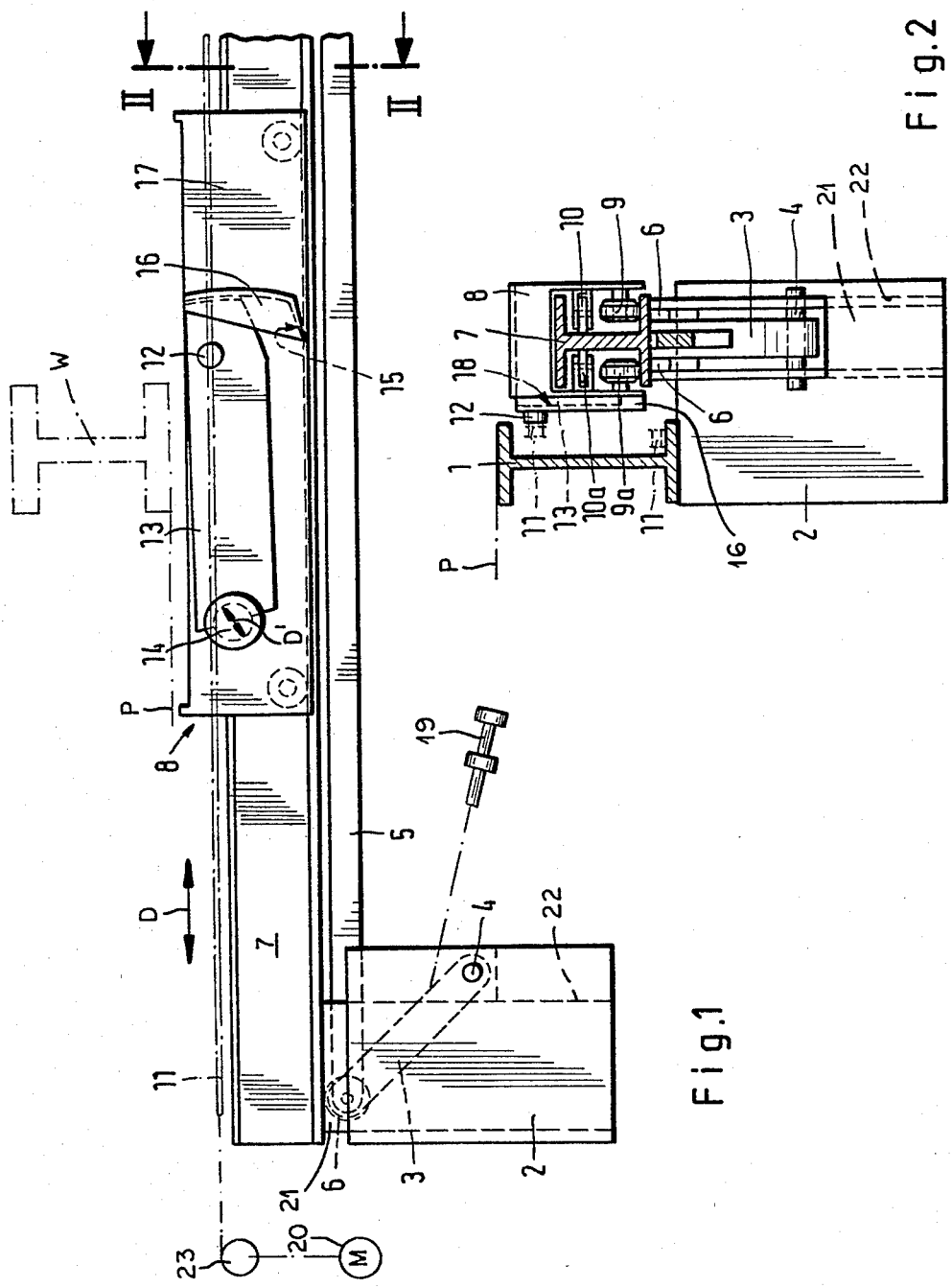

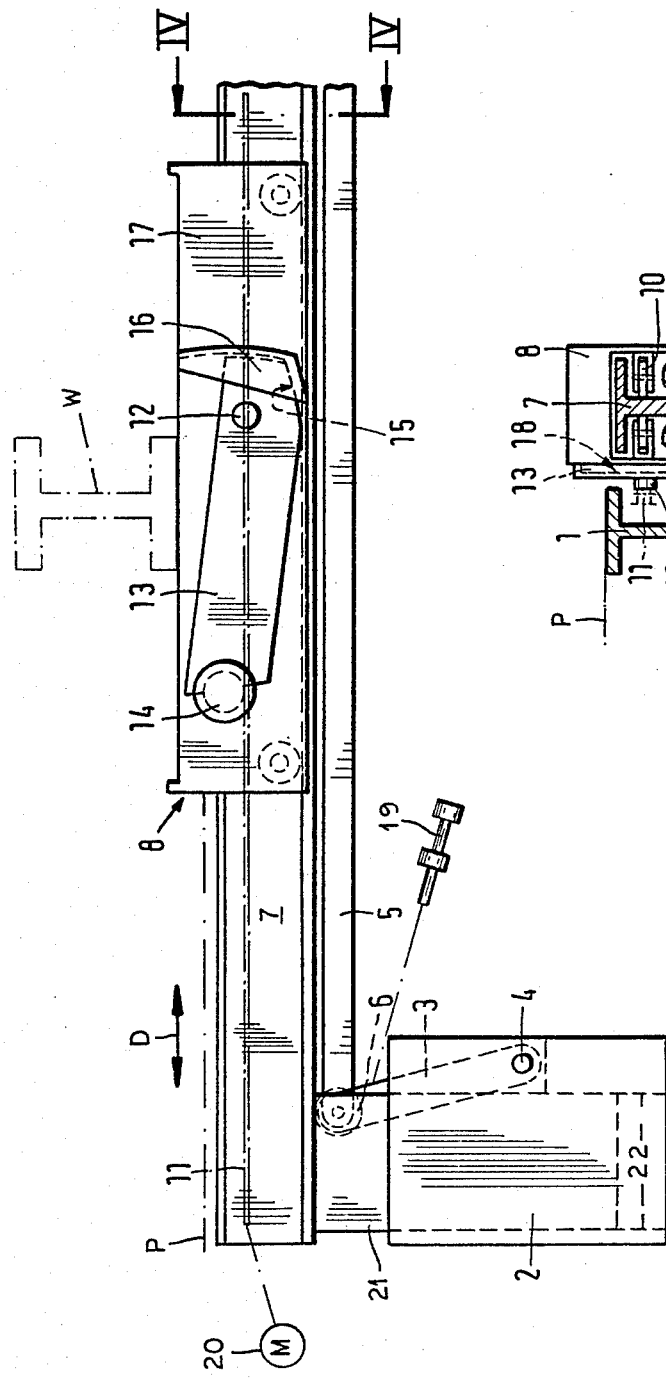
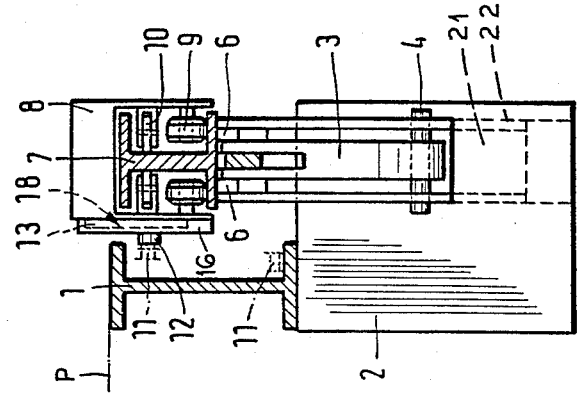
Fig. 3
Fig. 4

TRANSPORTER FOR HEAVY LOADS

FIELD OF THE INVENTION

The present invention relates to an apparatus for transporting heavy loads. More particularly this invention concerns a so-called transverse conveyor used in a mill to move the workpieces—bars, plates, and the like—from one production line to another.

BACKGROUND OF THE INVENTION

In a steel mill or the like the workpieces are passed along production lines where they are rolled, sawed, bored, coated, and subject to various treatments. The workpieces are usually elongated and displaced longitudinally, that is parallel to their longitudinal directions, in the individual lines. Movement from line to line must be transverse, since the lines are usually arranged parallel to one another.

To this end the downstream or output end of one production line is normally separated from the upstream or intake line of the next line by a table formed by a plurality of support beams extending between the two lines horizontally and parallel to each other but transverse to the lines. These beams have upper surfaces that define a plane and serve to support the workpieces between operations. One side of the table can be loaded directly from the line by a piece of automatic equipment, or by a fork lift. From the opposite side the workpieces can be taken off by another conveyor, fork lift, or the like.

To displace the workpieces transversely on the table, and to rearrange them thereon as such a table is frequently used as a depot, at least two synchronously operating carriages or wagons are used. Each rides on a vertically displaceable guide beam extending parallel to the support beams. When in an upper position the guide beam holds the carriage at least partially above the plane of the table, and when in a lower position the carriage is spaced below this plane. Thus the carriages can be raised up underneath a load to be moved transversely, raising it slightly above the table so it can be displaced transversely to its longitudinal direction and to the transport direction of the lines.

The carriages are connected to one stretch of a flexible drive element, e.g. a chain or cable, that is reeved normally as an endless loop over two wheels constituted as pulleys or sprockets. One of these wheels can be driven in either direction to move the carriages horizontally. Once the carriages have raised up underneath and picked up a load, the chain then is appropriately driven to position the picked-up load transversely.

Obviously as each carriage is raised and lowered it deflects the drive element up and down, respectively. This adds considerably to the tension in this element needed to position the carriage accurately. In addition the actuator system that raises the carriages and the load they carry must also provide the force necessary to thus deflect the drive element, force that serves no useful function. This extra tension subjects the drive element and associated structure to considerable wear. In addition downward displacement of the carriage must be effected positively, gravity alone cannot suffice to exert enough force to deflect the drive element down. This is another waste of energy.

OBJECTS OF THE INVENTION

It is therefore an object of the present invention to provide an improved apparatus for moving a heavy load.

Another object is the provision of such an apparatus which overcomes the above-given disadvantages.

A yet further object is to provide a table-type displacer of the above-described general type, but wherein drive-element wear is reduced.

SUMMARY OF THE INVENTION

These objects are attained according to the instant invention in a heavy-load transport apparatus having, as is known, a stationary support beam extending horizontally in a transport direction and adapted to support an elongated heavy load with same lying on the support beam and extending horizontally transversely thereto, a guide beam extending in the direction generally parallel to the support beam, and a carriage riding on the guide beam and displaceable in the direction therealong. Lifting means connected to the guide beam can vertically displace same between an upper position with the carriage at least partly above the support beam and a lower position with the carriage below the support beam. Thus when the carriage underlies the load and is raised from the lower to the upper position it raises the load off the support beam. Drive means including a flexible drive element has a generally straight stretch extending parallel to the direction adjacent the guide beam for displacing the carriage therealong. According to this invention a pivot on the carriage defines a horizontal pivot axis generally perpendicular to the direction and a rigid connection arm extends generally horizontal and parallel to the direction between the carriage and the stretch. This arm has an inner end connected to the carriage at the pivot for angular displacement of the arm about the axis and an outer end connected to the stretch. Thus as the carriage is raised and lowered the outer arm pivots down and up substantially without vertically deflecting the stretch.

According to another feature of the invention the carriage is displaceable through a predetermined vertical distance on movement between the upper and lower positions. The arm has between its ends a horizontal length equal to at least four times the distance and easily substantially more. Thus the vertically effective force on the drive-element stretch is very small, but at the same time the element can transmit considerable force without play.

In accordance with yet another feature of the invention the arm is pivotal through an angle of between 4° and 20°, preferably between 6° and 12°. More particularly, the outer end of the arm lies above the inner end in the upper position of the carriage and below the inner end in the lower position thereof. The pivot axis is spaced above the stretch in the upper position by a predetermined distance and is spaced below the stretch in the lower position by a substantially shorter distance. The shorter distance is at most half the predetermined distance. In addition the arm forms between its ends a predetermined angle with the stretch in the upper carriage position and an angle at most half as great therewith in the lower carriage position. Thus the arm will be horizontal at about the intermediate position where the upper face of the carriage is level with the plane of the table. The carriage arm will only pivot up some 2° from this perfectly horizontal position in the fully lowered position but down some 6° in the raised position. In this raised position the carriage is normally carrying a load, so there is little possibility of it tipping on the support rail.

According to this invention the element is a chain having the stretch and the drive means includes means for maintaining the stretch taut. In addition the outer end of the arm lies above the inner end in the upper position of the carriage and below the inner end in the lower position thereof. The apparatus also has a stop engageable up against the outer end of the arm in the upper position of the carriage. Thus any shocks to the carriage, which will only occur in the raised condition of the carriage as when, for example, the carriage is pushing a stack of bars together, will be transmitted by the stop directly from the carriage to the outer end and thence to the drive element. A stop is not necessary for the lowered position of the carriage, as in this position it is never loaded nor can it come into contact with anything that would stress the pivot excessively. For this reason in the lowered position the pivot can easily handle the full load.

The arm according to the invention the arm is a plate lying in a vertical plane parallel to the direction. In addition the stop can define a vertical guide slot for the outer end of the arm. In fact this stop can be a pocket fixed on the carriage and receiving the outer end of the arm and forming for the arm a first stop turned horizontally toward the carriage and a second stop engageable upward against the outer end in the upper position of the carriage.

In accordance with another invention feature the support beam is an I-beam that has upper and lower flanges vertically flanking the stretch. In fact both the upper and lower stretches of the drive chain can both be between these flanges, completely out of the way and safe.

The lifting means includes, according to the invention, a parallelogrammatic linkage connected to the guide beam. This linkage has an upper member parallel to the guide beam, upright links pivoted on the upper member, and an actuator connected thereto. The upper member carries rollers engageable upward against the guide beam and guide means is provided for the guide beam permitting same to move vertically but not horizontally. This upper member is movable horizontally as well as vertically. The actuator is a fluid cylinder. In such a system the support beam will remain perfectly horizontal so that minimal force will be needed to convey the workpieces thereon.

The pivot of this invention includes a pivot pin having a relatively large diameter equal at least the vertical distance through which the carriage moves on displacement between its lower and upper position. This pivot pin is therefore generally level with the element in the upper and lower positions. Hence force transmission between the inextensible drive element and the carriage is direct.

DESCRIPTION OF THE DRAWING

The above and other features and advantages will become more readily apparent from the following, reference being made to the accompanying drawing in which:

FIG. 1 is a partly diagrammatic side view of the system of this invention in the lower position;

FIG. 2 is a section taken along line II—II of FIG. 1;

FIG. 3 is a view like FIG. 1 but with the apparatus in the raised or upper position; and FIG. 4 is a section taken along line IV—IV of FIG. 3.

SPECIFIC DESCRIPTION

As seen in the drawing a transport apparatus according to this invention acts on workpieces such as shown in dot-dash lines at W resting on a support plane P defined by the upper surfaces of a plurality of I-beams 1 (only one shown in the drawing) supported by posts 2 and extending parallel to each other in a transverse transport direction D. Immediately adjacent at least some of these beams 1 are respective smaller guide I-beams 7 (only one shown in the drawing) fixed at their ends in vertical posts 21 slidable in vertical guide passages 22 of the respective posts 2. Each guide beam 7 therefore always remains horizontal and parallel to its respective support beam 1 but can move vertically relative thereto between the lower position of FIGS. 1 and 2 well below the plane P of these beams 1, to the upper or raised position of FIGS. 3 and 4 nearly level with this plane P.

Extending underneath each beam 7 is a lighter bar or upper link 5 of a parallelogrammatic linkage having two end links 3 pivoted at their lower ends on pivots 4 extending horizontally perpendicular to the direction D. The pivot between the upper end of each link 3 and the outer end of the beam 7 is formed by a roller 6 that runs on the underside of the vertically movable bar. A hydraulic cylinder 19 connected to one of these links 3 or 5 can tip the entire linkage 3—6 back and forth to move the beam 5 between the upper and lower positions described above.

Each guide beam 7 has a respective carriage 8 that is generally U-shaped and open downward so that it sits over the beam 7. Horizontal pins 9a extending from the sides of the carriage 8 carry rollers 9 that ride on the lower flange of the beam 7 and vertical pins 10a above the pins 9a carry rollers 10 that engage the web of the beam 7 immediately underneath the upper flange thereof. One such set of rollers 9 and 10 is provided at each end of the carriage 8 so it is solidly supported on the beam 7 but can roll readily in the direction D therealong.

The carriage 8 is displaced back and forth in the direction D by a motor 20 connected to a chain 11 spanned at its end over wheels 23 that maintain it taut in two stretches, one immediately underneath the upper flange of the beam 1 and the other immediately above the lower flange thereof. This chain 11 lies between the carriage 8 and the web of the beam 1 and is wholly within the outlines of the beam 1 so that it is well protected.

According to this invention the carriage 8 has adjacent its one end a pivot pin 14 of diameter D' and projecting horizontally from the one flange of the U-shaped carriage 8 toward the beam 1 and perpendicular to the direction D. This pin 14 carries the inner end of an arm 13 formed as a thick flat plate lying in a vertical plane parallel to the direction D. The outer end of this arm 13 carries a pin 12 projecting parallel to the pin 14 and clamped to the upper stretch of the chain 11. Thus this arm 13 constitutes a rigid link between the inextensible element 11 and the carriage 8.

The extreme outer end of the arm 13 is received in a slot or pocket 16 fixed to the respective side 17 of the carriage 8. This pocket 16 forms at its bottom a stop 15 limiting downward swinging of the arm 13 to at most 6° below a horizontal position. The inner face 18 of the pocket 16 limits any movement of the plate 13 away from the carriage 8, and the side surface 17 obviously limits pivoting in the opposite direction so that effectively the arm 13 cannot move horizontally perpendicular to the direction D.

On vertical displacement from the lower position of FIGS. 1 and 2 to the upper position of FIGS. 3 and 4 the arm only oscillates about the axis of the pin 14 through 8°, only 2° of them above a perfectly horizontal position and, as mentioned above, 6° below. The extent of vertical displacement between these two positions is about equal to the diameter D', so that the upper stretch of the element 11 is tangent to the top of a cylindrical extension of the pin 14 in the upper position and is tangent to the bottom of the extension in the lower position. Considerable force can therefore be transmitted through the arm 13 between the element 11 and the carriage 8.

In use, as is known, at least two such carriages 8 are moved in the position of FIGS. 1 and 2 beneath a workpiece W to be picked up. The actuators 19 then lift the carriages 8 to pick up the workpiece W, and the motors 20 then pull the carriages 8 in the desired direction via the elements 11 and arms 13. Once in the proper position, the workpiece W is deposited on the plane P of the beams 1 by lowering of the carriages back down.

The arms 13 allow the element 11 to be maintained under good tension, which tension will not change appreciably as the carriages 8 are raised and lowered. In the raised and lowered positions the effective connection to the carriage is at the pin 12 which lies at the level of the chain 11. The arm 13 is many times—here about seven—longer between the pivot 14 and pin 12 than the vertical distance the carriage 8 is normally displaced through, so that any vertical vector of force will be very small. Thus the system can operate with optimum tension on the element 11, and with much less strain in general on the structure than the prior-art arrangements.

I claim:

1. A heavy-load transport apparatus comprising:
    a stationary support beam extending horizontally in a transport direction and adapted to support an elongated heavy load with same lying on the support beam and extending horizontally transversely thereto;
    a guide beam extending in the direction generally parallel to the support beam;
    a carriage riding on the guide beam and displaceable in the direction therealong;
    lifting means connected to the guide beam for vertically displacing same between an upper position with the carriage at least partly above the support beam and a lower position with the carriage below the support beam, whereby when the carriage underlies the load and is raised from the lower to the upper position it raises the load off the support beam;
    drive means including a flexible drive element having a generally straight stretch extending parallel to the direction adjacent the guide beam for displacing the carriage along the guide beam;
    a pivot on the carriage defining a horizontal pivot axis generally perpendicular to the direction;
    a rigid connection arm extending generally horizontal and parallel to the direction between the carriage and the stretch, the arm having an inner end connected to the carriage at the pivot for angular displacement of the arm about the axis and an outer end connected to the stretch, whereby as the carriage is raised and lowered the outer end pivots down and up substantially without vertically deflecting the stretch; and
    a pocket-forming vertical guide slot fixed on the carriage and receiving the outer end of the arm, the slot forming for the arm a stop engageable upward against the outer end only in the upper position of the carriage, whereby force can be transmitted directly by the stop between the outer arm end and the carriage in the upper carriage position.

2. The heavy-load transport apparatus defined in claim 1 wherein the outer end of the arm lies above the inner end in the upper position of the carriage and below the inner end in the lower position thereof.

3. The heavy-load transport apparatus defined in claim 1 wherein the arm is a plate lying in a vertical plane parallel to the direction.

4. The heavy-load transport apparatus defined in claim 1, further comprising a pocket fixed on the carriage and receiving the outer end of the arm, the pocket forming another stop turned horizontally toward the carriage.

5. The heavy-load transport apparatus defined in claim 1 wherein the arm is pivotal through an angle of between 4° and 20°.

6. The heavy-load transport apparatus defined in claim 1 wherein the outer end of the arm lies above the inner end in the upper position of the carriage and below the inner end in the lower position thereof, the pivot being spaced above the stretch in the upper position by a predetermined distance and being spaced below the stretch in the lower position by a substantially shorter distance.

7. The heavy-load transport apparatus defined in claim 6 wherein the shorter distance is at most half the predetermined distance.

8. The heavy-load transport apparatus defined in claim 7 wherein the arm forms between its ends a predetermined angle with the stretch in the upper carriage position and an angle at most half as great therewith in the lower carriage position.

9. The heavy-load transport apparatus defined in claim 1 wherein the support beam is an I-beam.

10. The heavy-load transport apparatus defined in claim 9 wherein the I-beam has upper and lower flanges vertically flanking the stretch.

11. The heavy-load transport apparatus defined in claim 1 wherein the lifting means includes a parallelogrammatic linkage connected to the guide beam.

12. The heavy-load transport apparatus defined in claim 11 wherein the linkage includes an upper member parallel to the guide beam, upright links pivoted on the upper member, and an actuator connected thereto.

13. The heavy-load transport apparatus defined in claim 12 wherein the upper member carries rollers engageable upwardly against the guide beam.

14. The heavy-load transport apparatus defined in claim 13, further comprising guide means for the guide beam permitting same to move vertically but not horizontally, the upper member being movable horizontally as well as vertically.

15. The heavy-load transport apparatus defined in claim 12 wherein the actuator is a fluid cylinder.

16. The heavy-load transport apparatus defined in claim 1 wherein the pivot includes a pivot pin having a relatively large diameter equal at least the vertical distance through which the carriage moves on displacement between its lower and upper position, the pivot pin being generally level with the element in the upper and lower positions.

18. The heavy-load transport apparatus defined in claim 1 wherein the carriage is displaceable through a predetermined vertical distance on movement between the upper and lower positions, the arm having between its ends a horizontal length equal to at least four times the distance.

18. The heavy-load transport apparatus defined in claim 1 wherein the element is a chain having the stretch and the drive means includes means for maintaining the stretch taut.

* * * * *